United States Patent Office 3,546,307
Patented Dec. 8, 1970

3,546,307
PRODUCTION OF ETHYLCYCLOHEXENE
Donald C. Tabler, Bartlesville, Okla., assignor to Phillips Petroleum Company, a corporation of Delaware
No Drawing. Filed Nov. 14, 1968, Ser. No. 775,907
Int. Cl. C07c 5/16
U.S. Cl. 260—666       5 Claims

ABSTRACT OF THE DISCLOSURE

Selective hydrogenation of 4-vinylcyclohexene using a nickel sulfide catalyst to obtain high yields of ethylcyclohexene.

---

This invention relates to a process for producing ethylcyclohexene (including the various isomeric forms thereof) in high yields from 4-vinylcyclohexene.

It is known that 4-vinylcyclohexene can be subjected to catalytic hydrogenation to produce ethylcyclohexene with concurrent production of considerable amounts of ethylbenzene and/or ethylcyclohexane. Thus, the yield of ethylcyclohexene is less than optimum.

A process whereby 4-vinylcyclohexene can be converted to ethylcyclohexene in exceptionally high yields is thus desirable. It is a principal object of this invention to provide such a process.

The present invention involves the discovery that 4-vinylcyclohexene can be selectively hydrogenated over a nickel-sulfide catalyst to produce ethylcyclohexene in high yields such as 95% or more.

The process of the invention is carried out by introducing hydrogen and 4-vinylcyclohexene into a hydrogenator containing a nickel sulfide catalyst. To control temperature rise in the hydrogenator, the 4-vinylcyclohexene is preferably introduced therein in diluted form using diluents such as hexane, benzene or other inert hydrocarbons. The concentration of the 4-vinylcyclohexene can range from about 20 to 100 percent by weight. It is also preferred that the feed (4-vinylcyclohexene and any diluent which may be employed) contain sulfur which serves to maintain the catalyst in desired sulfide form. The sulfur can be naturally present in the diluent or sulfur-containing compounds such as carbon disulfide, thiophene and the like can be deliberately introduced.

The hydrogenation conditions employed in accordance with this invention can be summarized as follows:

|  | General | Preferred |
|---|---|---|
| Sulfur content of feed | 25 to 500 p.p.m. | 25 to 50 p.p.m. |
| Feed rate | 1–5 LHSV | 1–2 LHSV. |
| Hydrogenator pressure | 75–500 p.s.i.g. | 400–500 p.s.i.g. |
| Hydrogenator temperature | 300–550° F. | 380–420° F. |
| Hydrogen flow rate | 2 to 20 mols $H_2$ per mol of 4-vinycyclohexene. | 10 to 18 mols $H_2$ per mol of 4-vinylcyclohexene. |

The catalyst employed in accordance with this invention is a nickel sulfide catalyst carried on a support such as alumina, silica-alumina, magnesium oxide, calcium aluminate and the like. The catalyst can contain from about 5 to 15% by weight of nickel and a particularly preferred catalyst is nickel sulfide on alumina containing from 8 to 12% by weight nickel. The catalyst can be prepared by passing gas containing hydrogen sulfide over supported nickel at temperatures of from about 500 to 800° F. for periods of from 1 to 4 hours at a pressure of one atmosphere. The catalyst is then activated by flowing hydrogen gas thereover at a temperature of from 400 to 600° F. for a period of 2 to 8 hours at pressures ranging from one atmosphere to 100 p.s.i.g.

The following experimental data illustrates the advantages of the invention: A catalyst comprising nickel oxide on alumina (containing 11% by weight nickel) is sulfided by passing gas containing hydrogen sulfide over the catalyst at a temperature of about 700° F. for a period of 3 hours at a pressure of one atmosphere. The catalyst is then activated by flowing hydrogen gas thereover at a temperature of 500° F. for a period of 4 hours at a pressure of 100 p.s.i.g.

A feed consisting of 4-vinylcyclohexene diluted with n-hexane to a concentration of approximately 20 weight percent and containing 50 parts per million carbon disulfide was hydrogenated using a nickel sulfide catalyst as prepared above. The hydrogenation conditions and product analysis are summarized in Table I.

TABLE I

|  | Run 1 | Run 2 |
|---|---|---|
| Hydrogenator temp., °F | 435 | 400 |
| Hydrogenator pressure, p.s.i.g | 100 | 400 |
| Liquid feed rate, LHSV, total feed | 2 | 2 |
| $H_2$ flow, mols/mol 4-vinylcyclohexene | 10 | 12 |
| Product analysis, wt. percent, diluent-free basis: |  |  |
| Ethylcyclohexane | 0.16 | 1.1 |
| 1-ethylcyclohexene | 67.0 | 68.6 |
| 3-ethylcyclohexene | 19.9 | 19.5 |
| 4-ethylcyclohexene | 10.0 | 9.5 |
| Ethylbenzene | 2.5 | 1.e |
| Vinylcyclohexane | 0.48 | 0.12 |
| 4-vinylcyclohexene | None | Trac4 |

For comparison with the above, 4-vinylcyclohexene was hydrogenated using a different catalyst, namely 33% by weight nickel on silica-alumina. The hydrogenation conditions and product analysis are summarized in Table II.

TABLE II

| Hydrogenator temp., °F. | 392 |
|---|---|
| Hydrogen pressure, atm. | 1.0 |
| Liquid feed rate, LHSV | 0.8 |
| Catalyst | [1] 33 |
| Source of sulfur | [2] 1–2 |

| Product analysis: | Wt. percent |
|---|---|
| Ethylcyclohexane | 1.6 |
| 1-ethylcyclohexene | 52.3 |
| 3-ethylcyclohexene | 17.2 |
| 4-ethylcyclohexene | 7.4 |
| Ethylbenzene | 15.2 |
| Vinylcyclohexane | 0.4 |
| 4-vinylcyclohexene | 5.9 |

[1] Percent Ni on silica-alumina.
[2] Percent thiophene in feed.

As can be seen from the above data, hydrogenation of 4-vinylcyclohexene in accordance with the invention resulted in isomeric ethylcyclohexenes in yields of approximately 97% (Table I). In contrast, hydrogenation of 4-vinylcyclohexene as in Table II resulted in yields of ethylcyclohexene of about 77%. Yields on this order are generally obtained by prior art processes as represented, for example, by the process of U.S. Pat. No. 2,576,743.

Those modifications and equivalents which fall within the spirit of the invention are to be considered a part thereof.

I claim:
1. A process which comprises treating 4-vinylcyclohexene with hydrogen at a temperature of 300–550° F. in the presence of a nickel sulfide catalyst to produce ethylcyclohexene.
2. The process of claim 1 wherein the nickel sulfide catalyst is supported on alumina and the nickel content of the catalyst is from about 5 to 15% by weight.
3. The process of claim 1 wherein the 4-vinylcyclohexene is diluted with a diluent.
4. A process which comprises introducing into a reactor, containing a nickel sulfide catalyst, hydrogen and a feed comprising 4-vinylcyclohexene, a diluent therefor and from 25 to 500 parts per million sulfur based on total feed, the said feed being introduced at a rate from 1 to 5 (LHSV) and the hydrogen being introduced at a rate of 2 to 20 mols per mol of 4-vinylcyclohexene, the temperature within said reactor being within the range from about 300 to 550° F. and the pressure within said reactor being within the range of 75 to 500 pounds per square inch gauge.

5. A process which comprises introducing into a reactor, containing a nickel sulfide catalyst, hydrogen and a feed comprising 4-vinylcyclohexene, a diluent therefor and from 25 to 50 parts per million sulfur based on total feed, the said feed being introduced at a rate from 1 to 2 (LHSV) and the hydrogen being introduced at a rate of 10 to 18 mols per mol of 4-vinylcyclohexene, the temperature within said reactor being within the range from about 380 to 420° F. and the pressure within said reactor being within the range of 400 to 500 pounds per square inch gauge.

References Cited
UNITED STATES PATENTS

| | | | |
|---|---|---|---|
| 2,497,176 | 2/1950 | Mason | 260—683.9 |
| 3,239,453 | 3/1966 | Halik et al. | 260—667 |
| 3,244,757 | 4/1966 | Bloch | 260—666A |
| 3,268,608 | 8/1966 | De Rosset | 260—667 |
| 3,285,984 | 11/1966 | Goble | 260—667 |
| 3,359,339 | 12/1967 | Amagasa | 260—667H |
| 3,400,167 | 9/1968 | Henke et al. | 260—667 |
| 3,493,625 | 2/1970 | Zuech | 260—666 |

DELBERT E. GANTZ, Primary Examiner

V. O'KEEFE, Assistant Examiner